Sept. 22, 1959        A. J. LEVINE        2,905,213
BRACKET FOR ATTACHING TOOLS TO A PORTABLE ELECTRIC DRILL
Filed Feb. 14, 1957        2 Sheets-Sheet 1
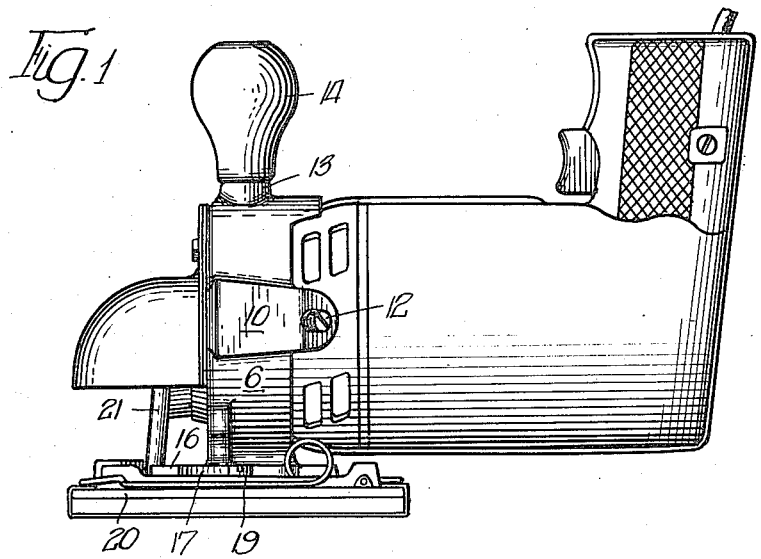
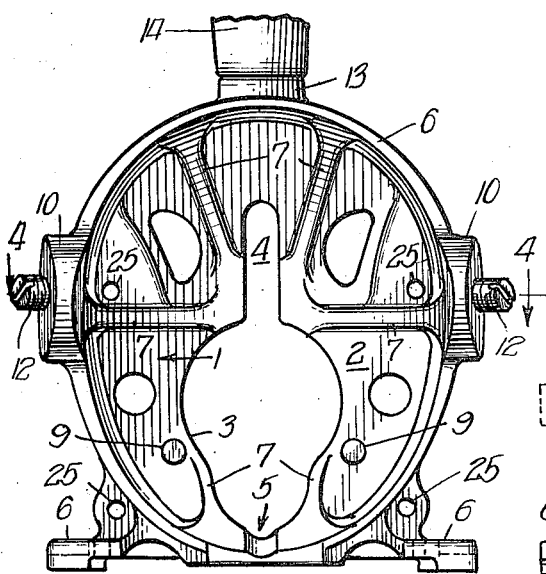
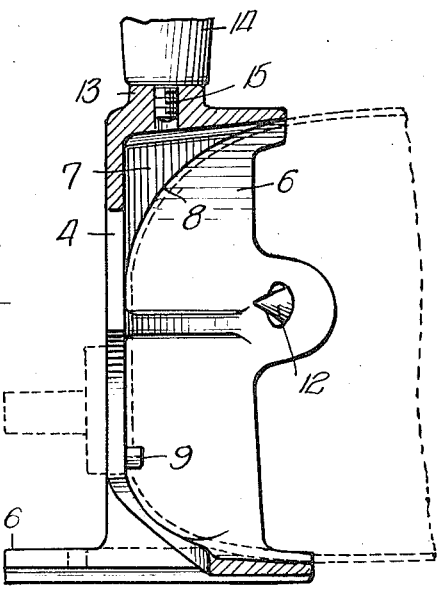
INVENTOR.
Aaron J. Levine,
BY George H. Simmons Sept. 22, 1959 A. J. LEVINE 2,905,213
BRACKET FOR ATTACHING TOOLS TO A PORTABLE ELECTRIC DRILL
Filed Feb. 14, 1957 2 Sheets-Sheet 2
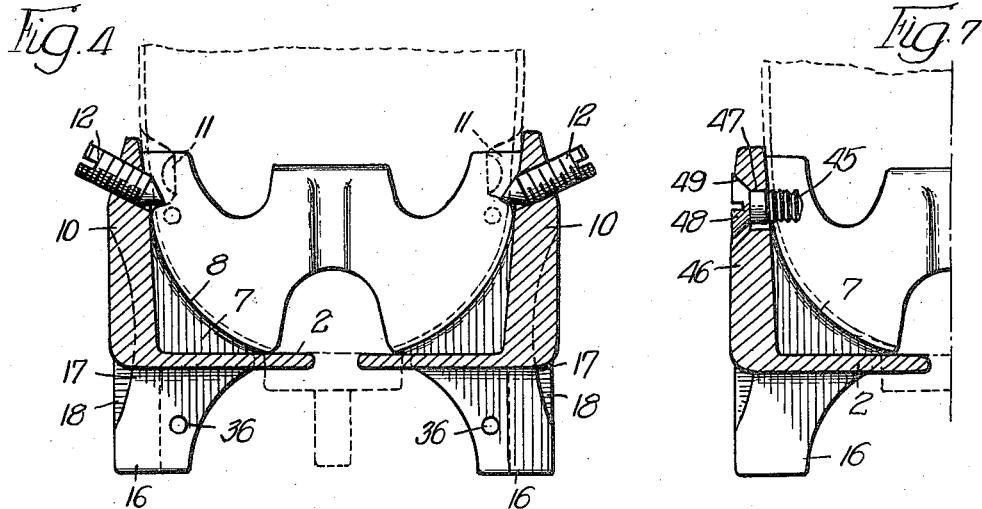
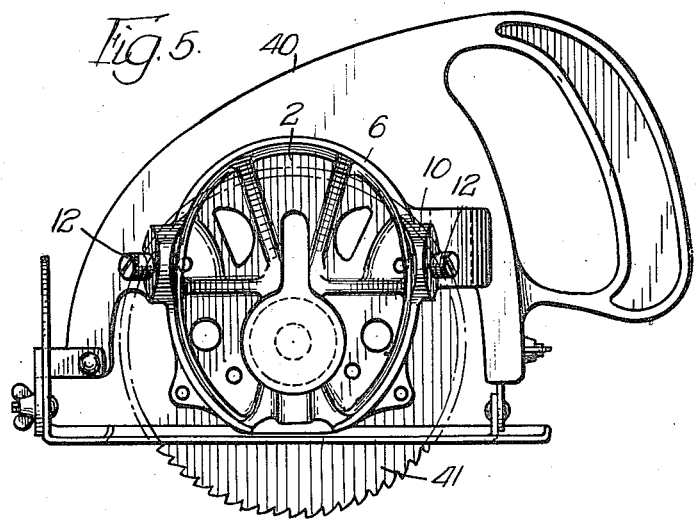
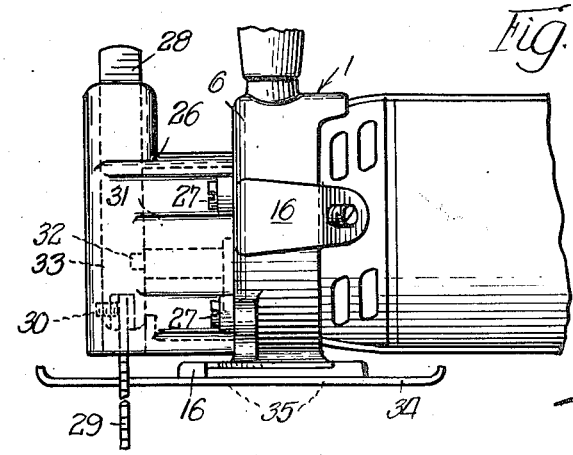
INVENTOR.
Aaron J. Levine,
BY George H. Simmons
atty United States Patent Office 2,905,213
Patented Sept. 22, 1959

2,905,213

BRACKET FOR ATTACHING TOOLS TO A PORTABLE ELECTRIC DRILL

Aaron J. Levine, Chicago, Ill., assignor to Shor-Line Industries, Inc., Chicago, Ill., a corporation of Illinois Application February 14, 1957, Serial No. 640,109

4 Claims. (Cl. 144—35)

This invention relates to a bracket for attachment to the casing of a portable electric drill to facilitate mounting on the drill tools that are to be driven thereby, and has for its principal object the provision of a new and improved bracket of this type.

It is a main object of the invention to provide a bracket capable of being accurately and securely positioned on the casing of a portable electric drill, thereby to position tools carried by the bracket accurately with respect to the drill shaft.

Another object of the invention is to provide a bracket that is adapted to mount different tools upon a portable electric drill casing.

Further objects of the invention not specifically mentioned here will be apparent from the detailed description and claims which follow, reference being had to the accompanying drawings in which a preferred embodiment of the invention is shown by way of example and in which:

Fig. 1 is a side elevational view of the bracket and tool mounted upon the casing of a portable electric drill;

Fig. 2 is an end elevational view, viewed from the motor end of the bracket;

Fig. 3 is a cross sectional view taken along a vertical plane through the center of the bracket and showing also the drill casing in dotted lines;

Fig. 4 is a cross sectional view through the bracket, taken substantially along the line 4—4 of Fig. 2, looking in the direction of the arrow;

Fig. 5 is an elevational view from the drill end, showing the bracket as a part of the framework of a circular saw;

Fig. 6 is a side elevational view of the bracket shown in Figs. 1 to 4, inclusive, with a saber saw attachment mounted thereon; and Fig. 7 is a fragmentary cross sectional view similar to Fig. 4 and showing a modified arrangement for attaching the bracket to the casing of a portable electric drill.

Portable electric drills of quarter inch capacity are frequently included in the equipment of a handy man or hobbyist, and there are upon the market numerous attachments for such drills, enabling use of the drill to power tools other than those for which the drills were originally made. It is to the improvement of the bracket for attaching such power driven tools to the portable electric drill that the present invention particularly relates.

Since the portable electric drills available on the market are housed in casings of various size and shape, brackets for attaching tools thereto must be necessarily tailored to fit a particular drill and must be modified if the bracket is to be used with a drill of another make. The present invention is shown by way of example tailored to fit a particular drill that is readily available upon the open market.

In order to have satisfactory operation of the power driven tool formed by attachment to a portable electric drill, it is necessary that the tool be accurately centered with respect to the axis of the shaft of the drill, and further it is necessary that the arrangement for attaching the tool to the drill must securely hold the tool with respect to the casing of the drill. The present invention is particularly directed to this feature.

The invention will be best understood by reference to the accompanying drawings from which it will be seen that the bracket, indicated generally at 1, consists of a planar end wall 2 that contains a perforation 3 through which the shaft of the drill can project. In the embodiment shown by way of example, since the particular drill to which the bracket is to be attached has a collar surrounding the shaft, the perforation 3 is of sufficient diameter to clear this collar and contains extensions 4 and 5 into which ribs on the drill casing project.

Rising out of the edges of the planar end wall 2 of the bracket are side walls 6 which are shaped to embrace the drill casing, at the end thereof out of which the shaft projects. In the example shown, the side walls 6 are generally oval in shape, that being the shape of the casing of the particular drill.

Located within the cuplike bracket so formed are positioning means by which the position of the bracket on the drill casing is determined longitudinally of the axis of the shaft of the drill. In the embodiment shown by way of example, the positioning means consists of ribs 7 that rise out of the planar end wall 2 and merge into the side walls 6, the free edges 8 of these ribs being shaped to conform to the shape of the end of the drill casing, as will be best seen in Figs. 3 and 4. Also, in the embodiment shown, the positioning means includes bosses 9 that project out of the planar end wall 2 and are adapted to abut against the end of the drill casing.

Formed integral with the wall 6 of the bracket and extending therefrom away from the end wall 2 are bosses 10 which are two in number and are diametrically opposed and spaced equidistantly from a plane through the axis of the drill shaft.

The particular drill with which the bracket shown in the drawings is adapted to work, contains in its casings sockets 11 Fig. 4 with which the bosses 10 register. The bosses are drilled and tapped to receive screws 12 which register with the sockets 11, and as the screws are tightened draw the bracket tightly upon the drill casing with the ends of the casing securely seated against the positioning means 7 and 9. By proper adjustment of the screws 12, the bracket can be fixed upon the drill casing so that the axis of the shaft of the drill will coincide with the center line of the bracket.

In the embodiment of the invention shown in Figs. 1 to 4, inclusive, the bracket is adapted to mount a sanding device upon the drill. To this end, the side walls 6 contain an upwardly extending boss 13 to which a handle 14 is attached by means of a screw 15. The side walls also blend into feet 16 which, as will be seen in Figs. 1 and 4, extend substantially equidistantly fore and aft of the end wall 2 of the bracket. Feet 16 are cut away, as indicated at 17, forming a step or ledge 18 by means of which the sanding foot 20 is attached to the bracket by screws 19, Fig. 1, the heads of which overlie the ledges 18. The particular details of the sanding foot are not of the essence of the present invention and are of the type generally shown in Patents 2,683,336 and 2,683,337. Mounted upon the shaft of the drill is a wobble wheel 21 which engages the sanding foot 20 to oscillate the foot along the feet 16 as the drill is operated.

The planar end wall 2 of the bracket contains threaded openings 25 which are positioned so as to facilitate mounting upon the bracket a saber saw in the manner shown in Fig. 6. The housing 26 of the saber saw attachment is mounted upon the outer surface of end wall 2 by screws 27, this bracket 26 carrying a shaft 28 to which the saw blade 29 is attached in convenient manner as by set screw 30. The shaft of the motor is equipped with a drive nut 31 which carries a pin 32 that is offset with respect to the axis of the nut and fits within a slot 33 in the shaft 28 to oscillate that shaft as the motor shaft is rotated.

When the saber saw is attached to the bracket 1, the sanding foot and wobble gear are necessarily removed therefrom and a plate 34 is attached to the feet 16 by screws 35 that are threaded into tapped openings 36, Fig. 4, in the feet 16, thereby to form a support for the device during operation of the saw.

The bracket of the present invention is shown in Fig. 5 as an integral part of the housing 40 of a circular saw, the end wall 2 of the bracket being an integral part of one of the walls defining the channel in which the saw blade 41 runs. The bracket is equipped with side walls 6 and bosses 10 as before, and screws 12 draw the bracket tightly upon the casing of the drill so as to position the saw blade 41 accurately in the channel in which it runs.

While the particular drill shown by way of example is equipped with sockets 11, into which the screws 10 project, there are available on the open market other drills which, instead of sockets, have threaded openings 45, Fig. 7, diametrically opposed in the casing of the drill. The bracket of the present invention adapted to be fitted upon such a drill casing, has bosses 46 which are similar to bosses 10 and which contain countersunk openings 47 adapted to receive flat head screws 48 that are threaded into threaded openings 45 in the drill casing. It will be noted that the countersunk openings 47 are of larger diameter than the screws 48 and are positioned so that as the screw is threaded into the openings 45 the tapered head of the screw engages the countersink along the side opposite the end wall 2 of the bracket, as indicated at 49. As the screw is tightened, the casing of the drill is thus drawn tightly against the positioning means 7 and end wall 2 of the bracket.

From the foregoing, it will be apparent that the bracket of the present invention is capable of being accurately centered with respect to the axis of the portable drill upon which it is mounted, and is securely fastened in such position so that the tool carried thereby will be accurately positioned for proper operation by the drill. By tailoring the side wall 6 and positioning means 7 to accurately conform to the contour of the casing, the bracket can be used in connection with drills of different manufacture.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described the preferred embodiment of my invention, what I consider new and desire to have protected by Letters Patent is pointed out in the appended claims.

What I claim is:

1. A bracket for mounting upon the casing of a portable electrical drill, in fixed position axially of the shaft thereof to support tools thereupon, comprising: a cup-like member having a planar end wall which contains a perforation through which the shaft of the drill can project and having side walls shaped to embrace the casing of the drill; ribs extending between said end and side walls and shaped to engage the end of the drill casing; bosses extending out of said end wall and adapted to engage the end of the drill casing; bosses formed in said side walls and extending therebeyond away from said end wall; and screw means engaging said sidewall bosses and the drill casing and adapted to exert a component of force axially of the drill shaft thereby to draw the casing tightly against said ribs and endwall bosses as the screw means are tightened.

2. A bracket for mounting upon the casing of a portable electric drill in fixed position axially of the shaft thereof to support tools thereupon, comprising a cup-like member having a planar end wall which contains a perforation through which the shaft of the drill can project and having side walls shaped to embrace the casing of the drill; ribs extending between said end and side walls and shaped to engage the end of the drill casing; bosses extending out of said end wall and adapted to engage the end of the drill casing; bosses formed in said side walls and extending therebeyond away from said end wall; and screw means comprising a shank and a casing-engaging end, said shank end adapted and arranged to exert a component of force axially of the drill shaft thereby to draw the casing tightly against said ribs and endwall bosses as the screw means are tightened.

3. A bracket for mounting upon the casing of a portable electric drill which has opposed sockets adjacent its shaft end, which bracket is held in fixed position axially of the casing to support tools thereupon, comprising: a cup-like member having a planar end wall which contains a perforation through which the shaft of the drill can project and having side walls shaped to embrace the casing of the drill; ribs extending between said end and side walls and shaped to engage the end of the drill casing; bosses extending out of said end wall and adapted to engage the end of the drill casing; bosses formed in said side walls and extending therebeyond away from said end wall; threaded openings in said sidewall bosses disposed in a plane that is parallel to the axis of the drill shaft, which openings converge towards a point in said plane that is adjacent said end wall; and screws threaded in said threaded openings and engaging the sockets in the drill casing, said screws drawing the casing tightly against said ribs and endwall bosses as the screws are tightened.

4. A bracket for mounting upon the casing of a portable electric drill which has opposed threaded openings adjacent its shaft end, which bracket is held in fixed position axially of the casing to support tools thereupon, comprising: a cup-like member having a planar end wall which contains a perforation through which the shaft of the drill can project and having side walls shaped to embrace the casing of the drill; ribs extending between said end and side walls and shaped to engage the end of the drill casing; bosses extending out of said end wall and adapted to engage the end of the drill casing; bosses formed in said side walls and extending therebeyond away from said end wall; countersunk openings in said sidewall bosses disposed with their axes in a plane that is parallel to the axis of the drill shaft; flat head screws extending through said openings and threaded into the casing openings, the tapered heads of said screws engaging one portion of the countersink in said sidewall openings to draw the casing tightly against said ribs and end wall bosses as the screws are tightened.

References Cited in the file of this patent

UNITED STATES PATENTS

| | | |
|---|---|---|
| 1,679,884 | Thomas | Aug. 7, 1928 |
| 1,785,065 | Abonn | Dec. 16, 1930 |
| 1,883,392 | Moll | Oct. 18, 1932 |
| 2,672,898 | Schuster | Mar. 23, 1954 |
| 2,714,905 | Clayton | Aug. 9, 1955 |